US010388159B2

(12) United States Patent
Yi et al.

(10) Patent No.: US 10,388,159 B2
(45) Date of Patent: Aug. 20, 2019

(54) INTERNET OF THINGS SYSTEM AND CONTROL METHOD THEREOF

(71) Applicant: HYUNDAI MOTOR COMPANY, Seoul (KR)

(72) Inventors: Kichang Yi, Suwon-si (KR); Hyoung Shin, Yongin-si (KR); Youngwook Song, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 134 days.

(21) Appl. No.: 15/378,451

(22) Filed: Dec. 14, 2016

(65) Prior Publication Data

US 2018/0012488 A1 Jan. 11, 2018

(30) Foreign Application Priority Data

Jul. 5, 2016 (KR) ........................ 10-2016-0084792

(51) Int. Cl.
*G08G 1/09* (2006.01)
*G08G 1/0967* (2006.01)
*B60N 2/56* (2006.01)
*H04W 4/70* (2018.01)

(52) U.S. Cl.
CPC ............. *G08G 1/0967* (2013.01); *B60N 2/56* (2013.01); *B60Q 2900/30* (2013.01); *H04W 4/70* (2018.02)

(58) Field of Classification Search
CPC ...... G08G 1/0967; H04W 4/005; H04W 4/70; B60N 2/56; B60Q 2900/30
See application file for complete search history.

(56) References Cited

U.S. PATENT DOCUMENTS 8,374,694 B2 * 2/2013 Kelly ................. A61N 1/37264 607/30
8,988,232 B1 * 3/2015 Sloo ......................... F24F 11/30 340/602
9,049,583 B2 * 6/2015 Kolodziej ............. H04W 4/023
2008/0097956 A1 * 4/2008 Amimoto ............ H04L 41/0806
2008/0264087 A1 * 10/2008 Harumoto .......... B60H 1/00735 62/190
2010/0268412 A1 * 10/2010 Mori ..................... B60W 10/30 701/31.4
2011/0127246 A1 * 6/2011 Heiden ..................... B60L 1/02 219/202

(Continued)

FOREIGN PATENT DOCUMENTS

KR 10-2014-0064969 A 5/2014
KR 10-1481536 B1 1/2015
KR 1020130094487 * 1/2015

*Primary Examiner* — Quang Pham

(74) *Attorney, Agent, or Firm* — Morgan, Lewis & Bockius LLP

(57) ABSTRACT

An Internet of things (IoT) system includes a user device for receiving a user setting mode execution command, a sensor for acquiring surrounding environment information based on the user setting mode upon receiving the user setting mode execution command from the user device, and a server device for determining a composite hazard index of environmental conditions based on the acquired environment information and prestored hazard index data and determining that the environmental conditions are hazardous if the composite hazard index is less than a predetermined reference value.

15 Claims, 12 Drawing Sheets

| EXECUTION MODE | CONDITIONS FOR TYPES OF ENVIRONMENT INFORMATION AROUND VEHICLE | INDIVIDUAL HAZARD INDEX |
|---|---|---|
| FIRST USER SETTING MODE | EXTERNAL TEMPERATURE ≤ -10℃ | -4 |
| | -10℃ < EXTERNAL TEMPERATURE ≤ 0℃ | -2 |
| | 0℃ < EXTERNAL TEMPERATURE ≤ 10℃ | 0 |
| | 10℃ < EXTERNAL TEMPERATURE ≤ 15℃ | 2 |
| | EXTERNAL TEMPERATURE > 15℃ | 4 |
| | 0 < AIR POLLUTION INDEX ≤ 50 | 4 |
| | 51 < AIR POLLUTION INDEX ≤ 100 | 2 |
| | 101 < AIR POLLUTION INDEX ≤ 250 | -2 |
| | AIR POLLUTION INDEX > 251 | -5 |
| | GPS == TUNNEL | -5 |
| | GPS == "TOWN, CITY, STREET" | 2 |
| | GPS == "LAKE-COUNTY, DUPAGE COUNTY.." | -3 |
| SECOND USER SETTING MODE | ~ | ~ |
| THIRD USER SETTING MODE | ~ | ~ |

(56) References Cited

U.S. PATENT DOCUMENTS

| | | | | |
|---|---|---|---|---|
| 2011/0196573 | A1* | 8/2011 | Lee | B60H 1/00428 701/36 |
| 2012/0244834 | A1* | 9/2012 | Behairy | H04W 4/021 455/406 |
| 2013/0187792 | A1* | 7/2013 | Egly | G08G 1/0965 340/901 |
| 2014/0280580 | A1* | 9/2014 | Langlois | H04W 4/70 709/204 |
| 2015/0026465 | A1* | 1/2015 | Cucinotta | H04L 63/0428 713/168 |
| 2015/0145995 | A1* | 5/2015 | Shahraray | H04W 4/70 348/148 |
| 2015/0249906 | A1* | 9/2015 | Thomas | H04W 4/027 455/418 |
| 2015/0254979 | A1* | 9/2015 | Haag | G06Q 50/26 340/905 |
| 2016/0047568 | A1* | 2/2016 | Chan | G05B 19/042 62/56 |
| 2016/0061472 | A1* | 3/2016 | Lee | G05B 15/02 700/276 |
| 2016/0089955 | A1* | 3/2016 | Ham | B60H 1/00742 165/202 |
| 2016/0117928 | A1* | 4/2016 | Hodges | G07C 5/008 701/99 |
| 2016/0132618 | A1* | 5/2016 | Lovell | G01C 21/26 703/8 |
| 2016/0152112 | A1* | 6/2016 | Stetler | B60H 1/00428 62/235.1 |
| 2016/0161137 | A1* | 6/2016 | Chen | G05B 13/0265 700/276 |
| 2016/0234377 | A1* | 8/2016 | Singhal | H04M 1/72577 |
| 2016/0260329 | A1* | 9/2016 | Lovitt | B60Q 9/008 |
| 2016/0272201 | A1* | 9/2016 | Kang | G05D 1/00 |
| 2017/0208438 | A1* | 7/2017 | Dickow | H04W 4/046 |

* cited by examiner

FIG.6

| EXECUTION MODE | CONDITIONS FOR TYPES OF ENVIRONMENT INFORMATION AROUND VEHICLE | INDIVIDUAL HAZARD INDEX |
|---|---|---|
| FIRST USER SETTING MODE | EXTERNAL TEMPERATURE ≤ -10℃ | -4 |
| | -10℃ < EXTERNAL TEMPERATURE ≤ 0℃ | -2 |
| | 0℃ < EXTERNAL TEMPERATURE ≤ 10℃ | 0 |
| | 10℃ < EXTERNAL TEMPERATURE ≤ 15℃ | 2 |
| | EXTERNAL TEMPERATURE > 15℃ | 4 |
| | 0 < AIR POLLUTION INDEX ≤ 50 | 4 |
| | 51 < AIR POLLUTION INDEX ≤ 100 | 2 |
| | 101 < AIR POLLUTION INDEX ≤ 250 | -2 |
| | AIR POLLUTION INDEX > 251 | -5 |
| | GPS == TUNNEL | -5 |
| | GPS == "TOWN, CITY, STREET" | 2 |
| | GPS == "LAKE-COUNTY, DUPAGE COUNTY.." | -3 |
| SECOND USER SETTING MODE | ~ | ~ |
| THIRD USER SETTING MODE | ~ | ~ |

FIG.7

| EXECUTION MODE | CONDITIONS FOR TYPES OF ENVIRONMENT INFORMATION AROUND VEHICLE | INDIVIDUAL HAZARD INDEX |
|---|---|---|
| FIRST USER SETTING MODE | EXTERNAL TEMPERATURE ≤ -10℃ | -4 |
| | -10℃ < EXTERNAL TEMPERATURE ≤ 0℃ | -2 |
| | 0℃ < EXTERNAL TEMPERATURE ≤ 7℃ | 0 |
| | 7℃ < EXTERNAL TEMPERATURE ≤ 11℃ | 1 |
| | 11℃ < EXTERNAL TEMPERATURE ≤ 15℃ | 2 |
| | EXTERNAL TEMPERATURE > 15℃ | 4 |
| | 0 < AIR POLLUTION INDEX ≤ 50 | 4 |
| | 51 < AIR POLLUTION INDEX ≤ 100 | 2 |
| | 101 < AIR POLLUTION INDEX ≤ 250 | -2 |
| | AIR POLLUTION INDEX > 251 | -5 |
| | GPS == TUNNEL | -5 |
| | GPS == "TOWN, CITY, STREET" | 2 |
| | GPS == "LAKE-COUNTY, DUPAGE COUNTY.." | -3 |
| SECOND USER SETTING MODE | ~ | ~ |
| THIRD USER SETTING MODE | ~ | ~ |

FIG.8

| EXECUTION MODE | ENVIRONMENT INFORMATION AROUND VEHICLE | COMPOSITE HAZARD INDEX |
|---|---|---|
| FIRST USER SETTING MODE | EXECUTION MODE = 5℃, AIR POLLUTION INDEX = 61, GPS = "CHICAGO" | 1.33 |
| | EXECUTION MODE = -10℃, AIR POLLUTION INDEX = 10 GPS = "COOK COUNTY" | -0.66 |
| | EXECUTION MODE = 20℃, AIR POLLUTION INDEX = 40, GPS = TUNNEL<br>⋮ | 1 |
| SECOND USER SETTING MODE | INTERNAL TEMPERATURE = XX, AIR POLLUTION INDEX = XX | XX |
| | INTERNAL TEMPERATURE = XX, AIR POLLUTION INDEX = XX<br>⋮ | XX<br>⋮ |
| THIRD USER SETTING MODE | VELOCITY = XX, GPS = XX<br>VELOCITY = XX, GPS = XX | XX |
| | VELOCITY = XX, GPS = XX<br>⋮ | XX<br>⋮ |

INTERNET OF THINGS SYSTEM AND CONTROL METHOD THEREOF

CROSS-REFERENCE TO RELATED APPLICATION

This application claims the benefit of priority to Korean Patent Application No. 10-2016-0084792, filed on Jul. 5, 2016 with the Korean Intellectual Property Office, the disclosure of which is incorporated herein by reference.

TECHNICAL FIELD

Embodiments of the present disclosure relate to Internet of things (IoT) systems, and methods of controlling the same, and more particularly, to IoT systems to determine whether a user setting mode is hazardous based on hazard index data and surrounding environmental conditions, and methods of controlling the same.

BACKGROUND

The Internet of things (IoT), extending to the Internet of Everything (IoE), has been recently proposed and has gained momentum. The IoT and IoE enable all objects to communicate with each other by internetworking the objects via a network. In this regard, the IoE, which is a concept extending from the IoT and is expected to be widely implemented in the future, interconnects everything including objects, and the term IoT will be used in the specification as a generic term that includes the IoE.

Recently, IoT systems have been used for household purposes due to relatively low risk factors. However, the use of IoT systems for automotive, industrial and medical purposes will grow along with enhancements of reliability.

SUMMARY

Therefore, it is an aspect of the present disclosure to provide an Internet of things (IoT) system to determine whether a user setting mode is hazardous based on hazard index data and surrounding environmental conditions when a command to execute the user setting mode is input, and a method of controlling the same.

It is another aspect of the present disclosure to provide an IoT system to reinforce the hazard index data based on user satisfaction information after executing the user setting mode, and a method of controlling the same.

Additional aspects of the disclosure will be set forth in part in the description which follows and, in part, will be obvious from the description, or may be learned by practice of the disclosure.

In accordance with one aspect of the present disclosure, an Internet of things (IoT) system includes a user device configured to receive a user setting mode execution command; a sensor configured to acquire surrounding environment information based on the user setting mode upon receiving the user setting mode execution command from the user device; and a server device configured to determine a composite hazard index of environmental conditions based on the acquired environment information and prestored hazard index data and determine that the environmental conditions are hazardous if the composite hazard index is less than a predetermined reference value.

The prestored hazard index data may include individual hazard indices for respective types of the environment information and for respective conditions of each type of the environment information in a prestored user setting mode.

The server device may determine individual hazard indices for respective types of the acquired environment information based on the prestored hazard index data and determines the composite hazard index of the environmental conditions based on the individual hazard indices.

If at least one of the individual hazard indices is less than a predetermined reference value, the server device may determine that the environmental conditions are hazardous by considering the individual hazard indices prior to the determined composite hazard index.

The server device may receive user satisfaction information about an execution result of the user setting mode and environment information acquired while executing the user setting mode from a plurality of user devices comprising the user device, and reinforces the hazard index data based on the satisfaction information and the environment information.

The server device may determine the composite hazard index based on the received satisfaction information and environment information, and determines individual hazard indices for respective types of the environment information and for respective conditions of each type of the environment information in the user setting mode based on the environment information and the composite hazard index.

The server device may transmit the hazard index data to the user device upon request from the user device.

The sensor may acquire environment information around a sensor related to the user setting mode among the sensors.

Upon receiving a new user setting mode execution command from a user, the server device may determine whether the new user setting mode is hazardous based on the hazard index data.

The server device may provide a user with an alarm upon determination that the environmental conditions are hazardous.

In accordance with another aspect of the present disclosure, a method of controlling an Internet of things (IoT) system include receiving a user setting mode execution command by a user device; acquiring surrounding environment information by a sensor upon receiving the user setting mode execution command; receiving the acquired environment information and determining a composite hazard index of environmental conditions based on the environment information and hazard index data prestored in a server device by the server device; and determining that the environmental conditions are hazardous if the composite hazard index is less than a predetermined reference value.

The prestored hazard index data may comprise individual hazard indices for respective types of the environment information and for respective conditions of each type of the environment information in a prestored user setting mode.

The determining of the composite hazard index of the environmental conditions based on the environment information and the hazard index data prestored in the server device may comprise determining individual hazard indices for respective types of the environment information based on the prestored hazard index data, and determining the composite hazard index of the environmental conditions based on the individual hazard indices.

The determining of the composite hazard index of the environmental conditions based on the environment information and the hazard index data prestored in the server device may include if at least one of the individual hazard indices is less than a predetermined reference value, determining that the environmental conditions are hazardous by considering the individual hazard indices prior to the determined composite hazard index.

The method may further include receiving user satisfaction information about an execution result of the user setting mode and environment information acquired when executing the user setting mode from a plurality of user devices comprising the user device by the server device; and reinforcing the hazard index data based on the satisfaction information and the environment information.

The reinforcing of the hazard index data based on the satisfaction information and the environment information comprises: determining the composite hazard index based on the satisfaction information and the environment information, and determining individual hazard indices for respective types of the environment information and for respective conditions of each type of the environment information based on the environment information and the composite hazard index.

The method may further comprise transmitting the hazard index data to the user device by the server device upon request from the user device.

The method may further comprise upon receiving a new user setting mode execution command from a user, determining whether the new user setting mode is hazardous based on the hazard index data by the server device.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 illustrates prestored hazard index data according to exemplary embodiments of the present disclosure.

FIG. 7 illustrates a table for describing a method of determining whether a user setting mode is hazardous according to exemplary embodiments of the present disclosure.

FIGS. 8 and 9 are a table and a flowchart, respectively, for describing a method of reinforcing hazard index data by a server device according to exemplary embodiments of the present disclosure.

DETAILED DESCRIPTION

Figure 1:
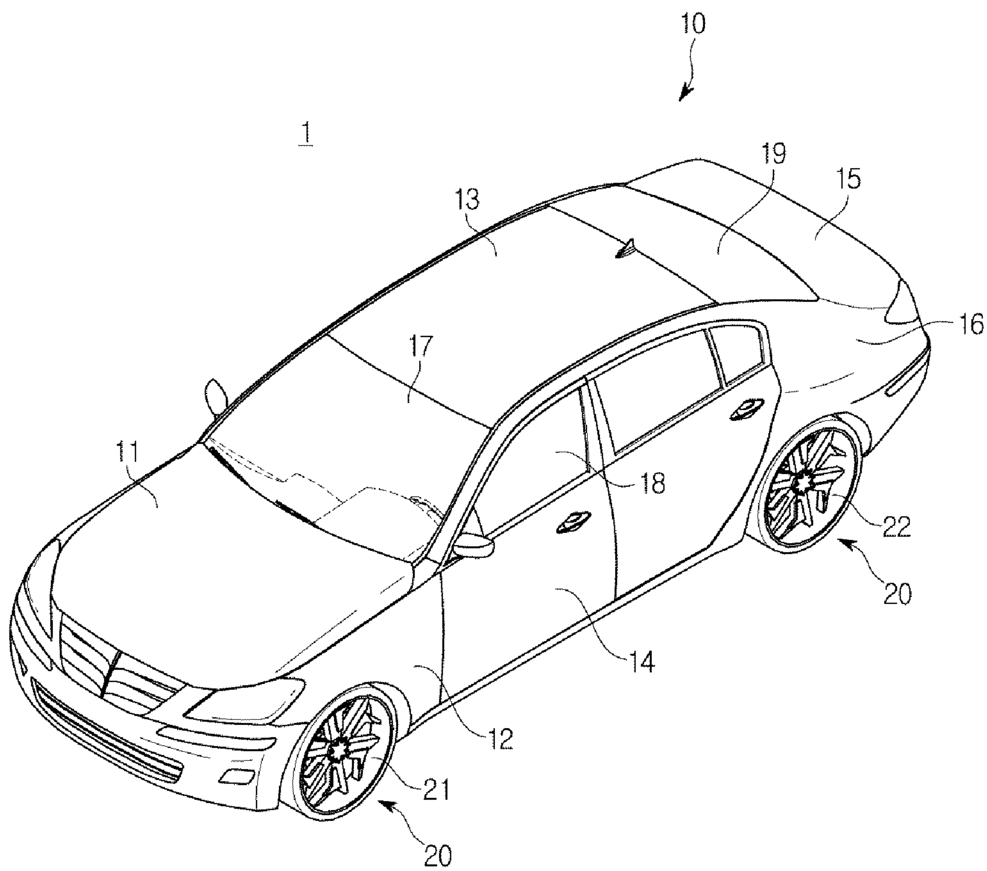
FIG. 1 is an exterior view of a vehicle according to exemplary embodiments of the present disclosure.

Reference will now be made in detail to the embodiments of the present disclosure, examples of which are illustrated in the accompanying drawings, wherein like reference numerals refer to like elements throughout.

Hereinafter, an Internet of Things (IoT) system and a method of controlling the same will be described in detail with reference to the drawings.

The IoT system and the method of controlling the same according to exemplary embodiments are intended to provide reliable IoT environments by determining whether an execution of a user setting mode is hazardous under the IoT environments.

The IoT system and the method of controlling the same may be applied to a variety of IoT environments for household, automotive, industrial and medical purposes. Hereinafter, the IoT system and the method of controlling the same according to exemplary embodiments will be described in detail based on a case applied to automotive environments for descriptive convenience.

To aid in understanding, the IoT system according to embodiments will be described after briefly describing environments, or elements, of a vehicle to which the IoT system is applied.

Figure 2:
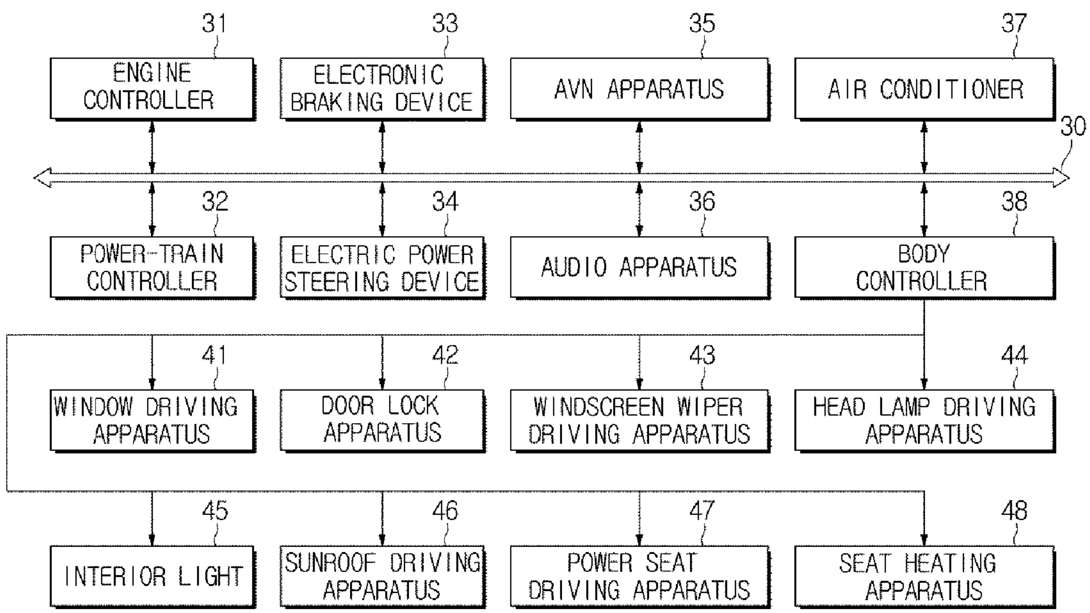
FIG. 2 is schematic diagram illustrating electronic devices of a vehicle according to exemplary embodiments of the present disclosure.
Figure 3:
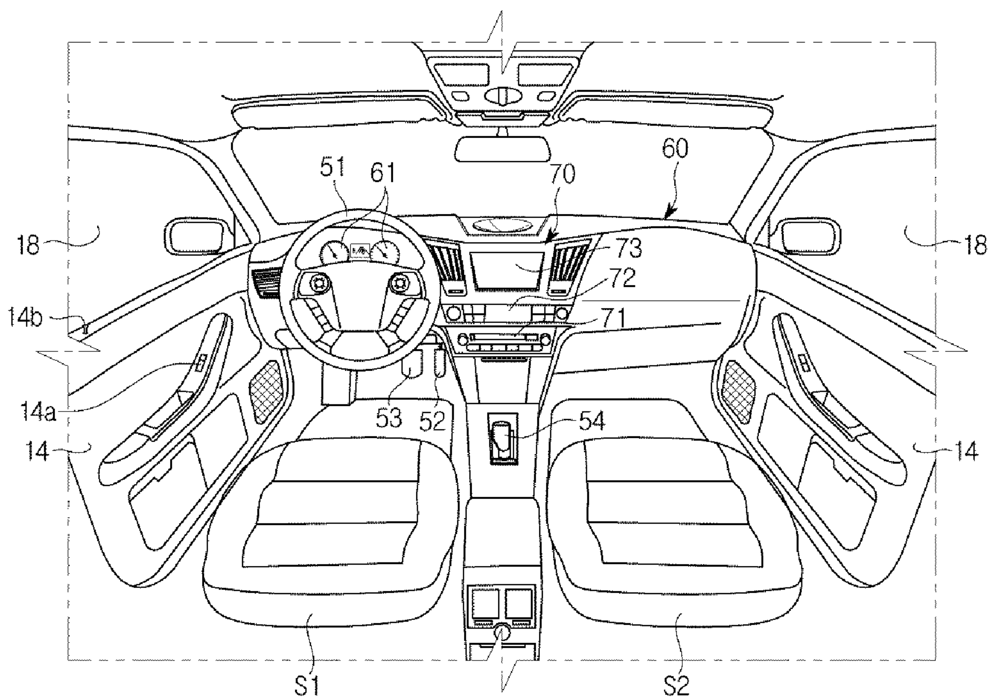
FIG. 3 is an interior view of a vehicle according to exemplary embodiments of the present disclosure.

FIG. 1 is an exterior view of a vehicle according to exemplary embodiments of the present disclosure. FIG. 2 is a diagram illustrating electronic devices of a vehicle according to exemplary embodiments of the present disclosure. FIG. 3 is an interior view of a vehicle according to exemplary embodiments of the present disclosure.

As illustrated in FIG. 1, a vehicle 1 includes a body 10 defining an appearance of the vehicle 1 and accommodating various parts and wheels 20 configured to move the vehicle 1.

The body 10 may include a hood 11, front fenders 12, a roof panel 13, doors 14, a trunk lid 15, quarter panels 16 and the like to constitute an indoor space where a user stays. Also, a front window 17 may be installed at a front portion of the body 10, and side windows 18 may be installed at sides of the body 10 to provide the user with views. A rear window 19 may also be installed at a rear portion of the body 10.

The body 10 may include a power generation apparatus, a power transmission apparatus, a steering apparatus, a brake apparatus and the like to operate the vehicle 1. The power generation apparatus for generating a rotational force of the wheels 20 may include an engine, a fuel supply apparatus, a cooling apparatus, an exhaust apparatus, an ignition apparatus and the like. The power transmission apparatus transmitting the rotational force generated by the power generation apparatus to the wheels 20 may include a clutch, a gearshift lever, a transmission, a differential gear device, a drive shaft, and the like. The steering apparatus controlling a proceeding direction of the vehicle 1 may include a steering wheel, a steering gear, a steering link and the like. The brake apparatus for stopping rotation of the wheels 20 may include a brake pedal, a master cylinder, a brake disc, a brake pad and the like.

The wheels 20 include front wheels 21 disposed at front portions of the vehicle 1 and rear wheels 22 disposed at rear portions of the vehicle 1. The vehicle 1 may move forward and backward by rotation of the wheels 20.

The vehicle 1 may further include various electronic devices for the safety and convenience of the user in addition to the aforementioned mechanical devices.

For example, the vehicle 1 may include an engine controller 31, a powertrain controller 32, an electronic braking device 33, an electric power steering device 34, an Audio/

Video/Navigation (AVN) apparatus 35, an audio apparatus 36, an air conditioner 37 and a body controller 38 as illustrated in FIG. 2.

The engine controller 31 controls fuel injection, gas mileage feedback, lean combustion, ignition timing, idle RPM and the like.

The powertrain controller 32 controls shifting of gears, damper clutch, pressure during On/Off operations of a frictional clutch, engine torque during shifting of gears, and the like.

The electronic braking device 33 controls the brake apparatus of the vehicle 1 and may include an anti-lock brake system (ABS).

Also, the electric power steering device 34 may assist steering manipulation of the user by reducing a required steering force during low-speed driving or parking and by increasing the required steering force during high-speed driving.

The AVN apparatus 35 may output music or images in accordance with a user's input or display a route to a destination input by the user. The audio apparatus 36 may reproduce sounds stored in a storage medium such as a compact disk (CD) or receive and play radio programs. The air conditioner 37 may heat or cool air in the vehicle 1 in accordance with an indoor temperature of the vehicle 1.

The body controller 38 may control operations of a window driving apparatus 41, a door lock apparatus 42, a windscreen wiper driving apparatus 43, a head lamp driving apparatus 44, interior lights 45, a sunroof driving apparatus 46, a power seat driving apparatus 47 a seat heating apparatus 48 and the like installed in the vehicle 1.

In this regard, the electronic devices of the vehicle 1 may communicate with each other via a vehicle communication network 30.

For example, the engine controller 31, the powertrain controller 32, the electronic braking device 33, the electric power steering device 34, the AVN apparatus 35, the audio apparatus 36, the air conditioner 37 and the body controller 38 may exchange data via the vehicle communication network 30. Also, the window driving apparatus 41, the door lock apparatus 42, the windscreen wiper driving apparatus 43, the head lamp driving apparatus 44, the interior lights 45, the sunroof driving apparatus 46, the power seat driving apparatus 47 and the seat heating apparatus 48 may also communicate with the body controller 38 via the vehicle communication network 30.

In this case, the vehicle communication network 30 may employ communication protocols such as Media Oriented Systems Transport (MOST) offering a bit rate up to 24.5 megabits/second (Mbps), FlexRay offering a bit rate up to 10 Mbps, Controller Area Network (CAN) offering a bit rate of 125 kilobits/second (kbps) to 1 Mbps, and Local Interconnect Network (LIN) offering a bit rate of 20 kbps. The vehicle communication network 30 may use not only a single communication protocol such as MOST, FlexRay, CAN, and LIN but also a plurality of communication protocols.

An indoor space where a user stays may be provided in the vehicle 1 and various input devices and output devices to allow the user to control the vehicle 1 may be installed in the vehicle 1.

For example, the interior of the body 10 may include first and second seats S1 and S2 for a driver and a passenger, a steering wheel 51 to control a proceeding direction of the vehicle 1, an acceleration pedal 52 to control a speed of the vehicle 1, a brake pedal 53 to control braking of the vehicle 1 and a gearshift lever 54 to shift gears of the vehicle 1 as illustrated in FIG. 3.

Also, the interior of the vehicle 1 may be provided with a dashboard 60 in which an instrument cluster and a control panel are installed and a center fascia 70.

The dashboard 60 may be a laterally extending panel shape in front of the user. The dashboard 60 may be provided with an instrument cluster 61 to display information related to driving of the vehicle 1, the steering wheel 51 to control the proceeding direction of the vehicle 1, and an airbag (not shown) to protect the user in case of collisions.

The center fascia 70 may extend downward from a central portion of the dashboard 60. The center fascia 70 may be provided with an audio control panel 71 to control the audio apparatus 36, an air conditioner control panel 72 to control the air conditioner 37, and a display panel 73 of the AVN apparatus 35 to display a route to the destination to the user or output sounds and images.

The user may control operations of the vehicle 1 by using various input devices installed in the vehicle 1. For example, the driver may drive the vehicle 1 via the acceleration pedal 62 and control the proceeding direction of the vehicle 1 via the steering wheel 60.

Furthermore, the user may control the audio apparatus 36 by using the audio control panel 71 or control the air conditioner 37 by using the air conditioner control panel 72. Also, the user may raise or lower the side windows 18 by using window switches 14*a* installed at the doors 14 or lock or unlock the doors 14 by using door lock switches 14*b*.

As described above, the user may also control the electronic devices of the vehicle 1 such as the window driving apparatus 41, the door lock apparatus 42, the windscreen wiper driving apparatus 43, the head lamp driving apparatus 44, the interior lights 45, the sunroof driving apparatus 46, the power seat driving apparatus 47, the seat heating apparatus 48 as well as a main apparatus related to driving of the vehicle 1 by using various input devices installed in the vehicle 1.

The user may also control the electronic devices of the vehicle 1 by using a user interface in addition to the various input devices installed in the vehicle 1. More particularly, the user may control the electronic devices of the vehicle 1 more efficiently by executing a predetermined user setting mode via a user device.

Hereinafter, the user setting mode is defined as a control mode to control various electronic devices of the vehicle 1 more conveniently. The user setting mode may be designed during a manufacturing process of a vehicle control system in accordance with intentions of a designer or added by user's settings.

When the user inputs a user setting mode execution command, the IoT system applied to the vehicle may control operations of electronic devices based on the user setting mode execution command. In this case, the IoT system may determine whether to execute the user setting mode after considering hazardous factors of a surrounding environment.

Information about the hazardous factors of the surrounding environment may be prestored in a server device of the IoT system as a database of hazard index, and the database of hazard index may be reinforced as related data is accumulated.

Hereinafter, the IoT system configured to determine whether execution of the user setting mode is hazardous by sensing hazardous factors of the surrounding environment and a method of controlling the same will be described in more detail.

Figure 4:
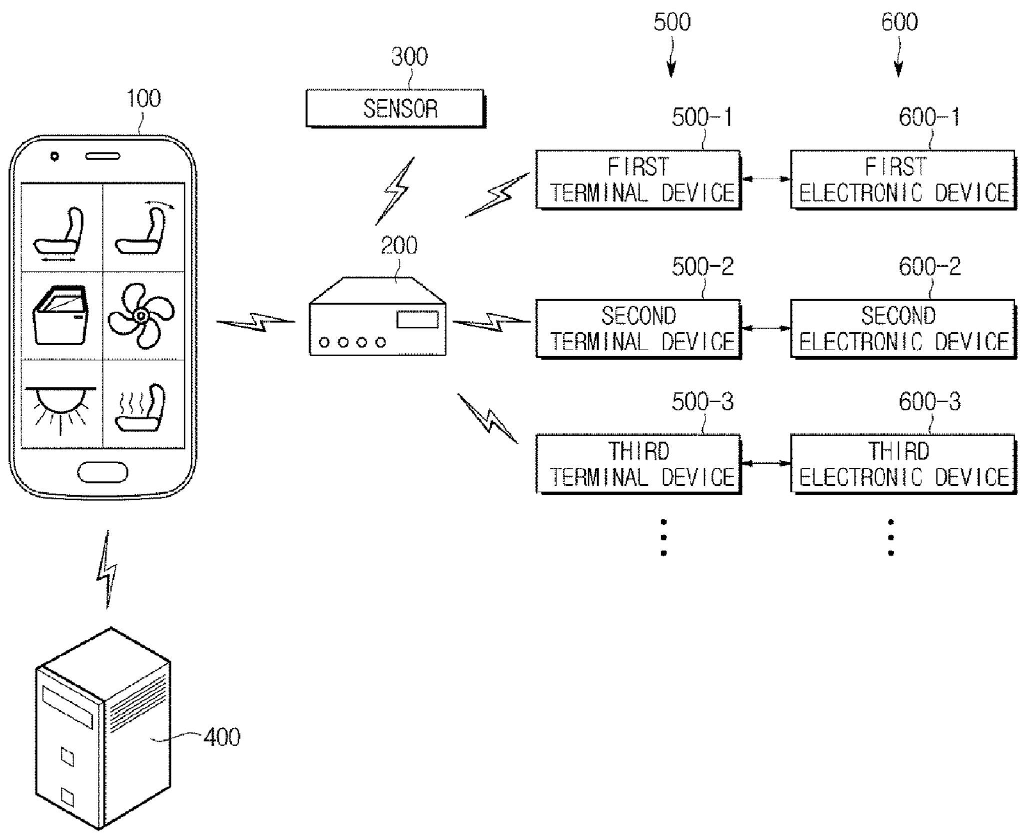
FIG. 4 is a conceptual diagram illustrating an IoT system according to exemplary embodiments of the present disclosure.
Figure 5:
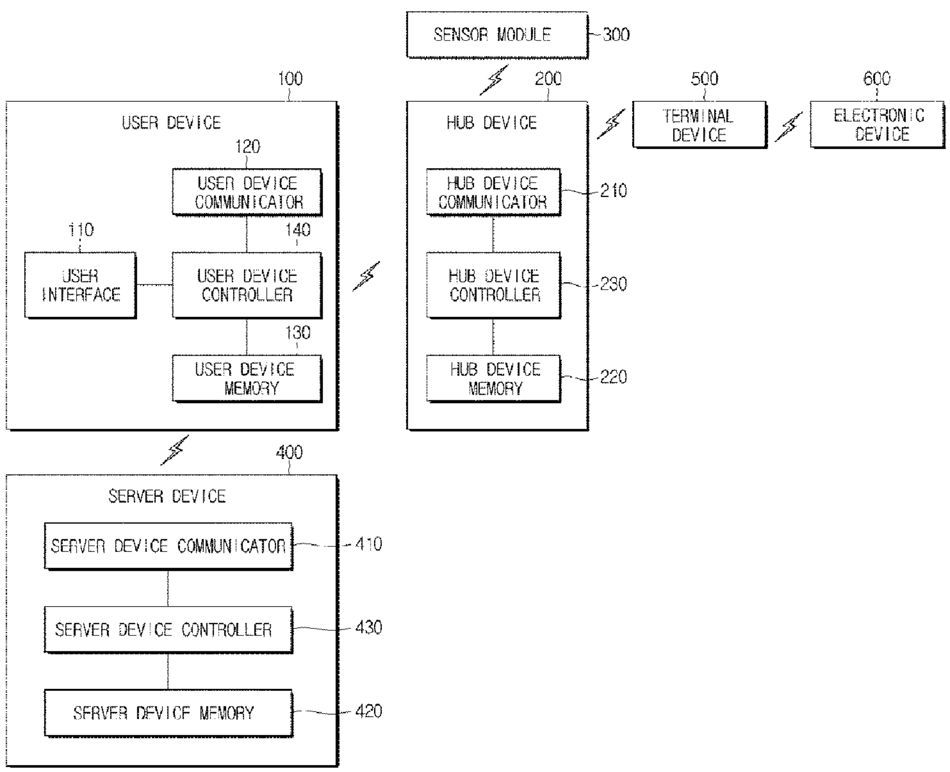
FIG. 5 is a control block diagram illustrating a control configuration of an IoT system according to exemplary embodiments of the present disclosure.

FIG. 4 is a conceptual diagram illustrating an IoT system according to exemplary embodiments of the present disclosure. FIG. 5 is a control block diagram illustrating a control configuration of an IoT system according to exemplary embodiments of the present disclosure.

Referring to FIGS. 4 and 5, the IoT system according to embodiments may include a user device 100, a hub device 200, a sensor 300, a server device 400, a terminal device 500 and an electronic device 600.

The user device 100 may receive a command to execute a user setting mode from a user. The user device 100 may include elements to receive a user setting mode execution command allowing the user to control the electronic device 600 (600-1, 600-2 and 600-3) of the vehicle and elements to communicate with the server device 400 and the hub device 200. For example, the user device 100 may be a cellular phone, a personal communication service, a personal digital assistant (PDA) and a remote controller, and may also be any device communicating therewith regardless of names thereof.

The user device 100 may include a user interface 110 configured to interact with the user, a user device communicator 120 configured to transmit/receive signals to/from the server device 400 or the hub device 200, a user device memory 130 configured to store data required for operations of the user device 100, and a user device controller 140 configured to control the operation of the user device 100.

The user interface 110 may receive a control command of the user and display information about operations of the hub device 200. The user interface 110 may include a power button to turn on/off power and an execution button to execute the user setting mode. The user interface 110 may include a liquid crystal display (LCD), a light emitting diode (LED) or the like.

The user interface 110 may display a screen to receive an input of the user setting mode execution command. A button to execute the user setting mode may be displayed on the screen of the user device 10 as an icon, text or a combination thereof.

The user setting mode may include a mode predefined by a designer during a process of designing the IoT system and a mode set by the user after the IoT system is constructed. For example, the user setting mode may include a mode of opening side windows of the vehicle when the weather is sunny and clear based on weather information provided by the National Weather Service, a mode of controlling On/Off operation of seat heating based on internal temperature of the vehicle, and a mode of controlling opening/closing of side windows while passing through a tollgate. However, the user setting mode is not limited to these examples described above.

The user device communicator 120 may transmit a control signal indicating a control command of the user to the hub device 200 via a wireless or wired communication network. Also, the user device communicator 120 may receive a state of the terminal device 500 or environment information around the vehicle acquired by the sensor 300 from the hub device 200 and transmit sensor values received from the hub device 200 to the server device 400

The user device communicator 120 may transmit user satisfaction information about an execution result of the user setting mode and sensor value information acquired by the sensor 300 to the server device 400. Also, the user device communicator 120 may request the server device 400 of hazard index data and transmit the hazard index data received from the server device 400 to the hub device 200 under the control of the user device controller 140.

The user device communicator 120 may exchange signals with peripheral devices using various communication protocols. For example, the user device communicator 120 may transmit/receive signals to/from the peripheral devices via at least one of Wi-Fi (IEEE 802.11), Bluetooth (IEEE 802.15.1) and Zigbee (IEEE 802.15.4).

The user device memory 130 may store programs and data used to control operations of the user device 100. The user device memory 130 may also store information about user settings for user setting modes and graphic data to display the information on the screen, and if required, hazard index data received from the server device 400.

The user device memory 130 may include volatile memories such as Static Random Access Memory (S-RAM) and Dynamic Random Access Memory (DRAM) and non-volatile memories such as Read Only Memory (ROM), Erasable Programmable Read Only Memory (EPROM), Electrically Erasable Programmable Read Only Memory (EEPROM) and flash memory.

The user device controller 140 may process the overall operations of the user device 100 and a flow of signals between internal elements and process data. If the user inputs a command or preset conditions are satisfied, the user device controller 140 may execute an operation system OS and various applications stored in the user device memory 130.

The user device controller 140 may transmit a control signal indicating a control command of the user to the hub device 200. In addition, the user device controller 140 may control the user device communicator 120 to receive the state of the terminal device 500 or sensor value information acquired by the sensor 300 from the hub device 200 and transmit the received sensor value information to the server device 400.

The user device controller 140 may receive a control signal including a determination result of the degree of hazard of the user setting mode from the server device 400 and process the received control signal. Upon determination that the environment around the vehicle is hazardous as a result of processing the control signal, the user device controller 140 may provide an alarm message notifying that the environment around the vehicle is hazardous via the user interface 110. On the contrary, upon determination that the environment around the vehicle is not hazardous, the user device controller 140 may transmit a control signal including a user setting mode execution command to the hub device 200.

Meanwhile, upon receiving the user satisfaction information about the execution result of the user setting mode via the user interface 110, the user device controller 140 may transmit the user satisfaction information to the server device 400 together with the sensor value information acquired by the sensor 300.

The hub device 200 may receive the user setting mode execution command from the user device 100 via a wireless or wired communication network and transmit the received execution command to the peripheral devices.

The hub device 200 may include a hub device communicator 210 configured to transmit/receive signals to/from the peripheral devices, a hub device memory 220 configured to store data required for operations of the hub device 200, a hub device controller 230 configured to control operations of the hub device 200.

The hub device communicator 210 may receive the user setting mode execution command from the user device 100 and transmit the received execution command to the sensor 300 and at least one of a plurality of terminal devices 500.

More particularly, the hub device communicator 210 may receive a first control signal from the user device 100 via a wireless or wired communication network. Also, the hub device communicator 210 may transmit a second control signal generated as a result of processing the first control signal to the sensor 300 and receive sensor value information corresponding to environment information around the vehicle from the sensor 300. The hub device communicator 210 may also transmit sensor value information received from the sensor 300 to the user device communicator 120 under the control of the hub device controller 230.

Also, the hub device communicator 210 may transmit a control signal to control the electronic device 600 generated by the hub device controller 230 to the terminal device 500 and receive information about operations of the electronic device 600 of the vehicle from the terminal device 500.

Descriptions about types of the hub device communicator 210 presented above with regard to the user device communicator 120 will not be repeated herein.

The hub device memory 220 may store programs and data used to control operations of the hub device 200. The hub device memory 220 may also store the first control signal received from the user device 100 and sensor value information corresponding to environment information around the vehicle received from the sensor 300.

The hub device memory 220 may also store hazard index data received from the user device 100.

Descriptions about types of the hub device memory 220 presented above with regard to the user device memory 130 will not be repeated herein.

The hub device controller 230 processes the overall operation of the hub device 200 and a flow of signals between internal elements and process data. If the user inputs a command or preset conditions are satisfied, the hub device controller 230 may execute an operation system OS and various applications stored in the hub device memory 220.

The hub device controller 230 may process the first control signal upon receiving the first control signal indicating the control command of the user from the user device 100. Particularly, the hub device controller 230 may generate the second control signal based on a target sensor of the control command included in the first control signal and the content of the control command and transmit the generated second control signal to the sensor 300.

The hub device controller 230 may receive the sensor value information acquired by the sensor 300 and transmit the received sensor value information to the user device 100. This process is performed to determine whether the user setting mode is hazardous based on the hazard index data stored in the server device 400.

If the user device 100 is disconnected from the server device 400, the hub device controller 230 may determine the degree of hazard of the user setting mode based on the hazard index data stored in the hub device memory 220 and the sensor value information received from the sensor 300. A method of determining the degree of hazard of the user setting mode will be described later.

The sensor 300 may acquire environment information around the vehicle and transmit acquired sensor value information to the hub device 200. Particularly, upon receiving the user setting mode execution command, the sensor 300 may acquire information about a hazard environment around the vehicle which might have a hazardous effect on people.

To this end, the sensor 300 may include a plurality of sensors 300. For example, the sensors 300 may include an external temperature sensor, an air pollution index sensor, a GPS device, an illuminance sensor, a speed sensor, and the like, installed in the vehicle. However, the types of the sensor 300 are not limited thereto.

The server device 400 controls the overall operation of the IoT system. The server device 400 may determine the degree of hazard when the user setting mode is executed under the current environmental conditions around the vehicle, based on prestored hazard index data. Also, upon receiving user satisfaction information about the execution result of the user setting mode from the user device 100, the server device 400 may reinforce the existing hazard index data based on the sensor value information regarding the environment around the vehicle and the user satisfaction information.

The server device 400 may include a server device communicator 410 configured to transmit/receive signals to/from the user device 100, a server device memory 420 configured to store data required for operations of the server device 400, and a server device controller 430 configured to control operations of the server device 400.

The server device communicator 410 may receive sensor value information regarding the environment around the vehicle acquired by the sensor 300 from the user device 100 and transmit the received information to the server device controller 430. The sensor value information transmitted to the server device controller 430 may be provided during a process of determining whether the environmental conditions for the user setting mode is hazardous.

The server device communicator 410 may receive the sensor value information acquired by the sensor 300 together with the user satisfaction information about the execution result of the user setting mode from the user device 100 and transmit the received information to the server device controller 430. The user satisfaction information and the sensor value information transmitted to the server device controller 430 may be provided during a process of reinforcing prestored hazard index data. Also, the server device communicator 410 may transmit the hazard index data constructed by the server device controller 430 to the user device 100 upon request by the user device 100.

Descriptions about types of the server device communicator 410 presented above with regard to the user device communicator 120 will not be repeated herein.

The server device memory 420 may store programs and data used to control operations of the server device 400. More particularly, the server device memory 420 may store programs and data used to determine the degree of hazard of a surrounding environment based on the sensor value information around the vehicle received from the user device 100 and may also store programs and data used to construct and reinforce the hazard index data based on the user satisfaction information about the execution result of the user setting mode and the sensor value information.

Also, the server device memory 420 may store the user satisfaction information and the sensor value information received from the user device 100 and also store information about the degree of hazard of the user setting mode and the hazard index data deduced therefrom.

Descriptions about types of the server device memory 420 presented above with regard to the user device memory 130 will not be repeated herein.

The server device controller 430 processes the overall operation of the server device 400 and a flow of signals between internal elements and processes data. If the user inputs a command or preset conditions are satisfied, the server device controller 430 may execute an operation system OS and various applications stored in the user device memory 130.

The server device controller 430 may determine the degree of hazard when the user setting mode is executed under the current environmental conditions around the vehicle, based on the hazard index data stored in the server device memory 420 and the sensor value information received from the user device 100.

More particularly, the server device controller 430 may determine individual hazard indices for respective types of the acquired environment information based on the pre-stored hazard index data, and then determine a composite hazard index of environmental conditions thereof based on the individual hazard indices. The server device controller 430 may determine an arithmetical mean of the individual hazard indices as the composite hazard index under the current environmental conditions. The composite hazard index may also be determined by weighting each of the individual hazard indices.

If the composite hazard index is less than a predetermined reference value, the server device controller 430 may determine that execution of the user setting mode is hazardous under the current environmental conditions around the vehicle. On the contrary, if the composite hazard index is greater than the predetermined reference value, the server device controller 430 may determine that the current environmental conditions around the vehicle are suitable to execute the user setting mode.

The reference value used to determine the degree of hazard of the composite hazard index may be prestored by the designer, reset by the user or derived from the reinforced hazard index data.

Also, the server device controller 430 may determine that an execution of the user setting mode is hazardous based on the individual hazard indices instead of the composite hazard index in exceptional situations. For example, when at least one of the individual hazard indices is less than a predetermined reference value even if the determined composite hazard index is greater than the reference value, the server device controller 430 may determine that execution of the user setting mode is hazardous under the current environmental conditions around the vehicle.

Also, the server device controller 430 may reinforce the hazard index data based on the user satisfaction information about the execution result of the user setting mode and environment information acquired during execution of the user setting mode received from the user devices 100. The server device controller 430 may receive the user satisfaction information and sensor value information of the sensor 300 from a plurality of user devices 100 and use the information to reinforce the hazard index data.

For example, the server device controller 430 may determine the composite hazard index based on satisfaction information and environment information received from a plurality of user devices 100. Here, the environment information may be information obtained by combining sensor values received from a plurality of sensors 300. For example, if first to third sensors 300 acquire environment information, the environment information may be sensor value information generated by the first to third sensors 300.

Then, the server device controller 430 may determine individual hazard indices for respective types of environment information and for respective conditions of each type of the environment information in the current user setting mode based on the environment information and the composite hazard index. For example, the server device controller 430 may determine sensor values acquired by the first sensor 300 as the same type of environment information, and may classify the sensor values acquired by the first sensor 300 by condition and determine individual hazard indices for the respective conditions.

The server device controller 430 may reinforce the pre-stored hazard index data by combining the determined individual hazard indices for the respective conditions.

Also, the server device controller 430 may control the server device communicator 410 to transmit the hazard index data to the user device 100 upon request from the user device 100.

Also, upon receiving a new user setting mode execution command from the user, the server device controller 430 may determine the degree of hazard of the user setting mode based on the prestored hazard index data and transmit the determined degree of hazard to the user device 100.

The terminal device 500 may receive a control signal generated by the control command of the user from the hub device 200 and output an electric signal corresponding to the control signal to the electronic device 600 of the vehicle.

The terminal device 500 may be provided correspondingly to the electronic device 600 of the vehicle. For example, a first terminal device 500-1 may be provided correspondingly to a first electronic device 600-1 of the vehicle, a second terminal device 500-2 may be provided correspondingly to a second electronic device 600-2 of the vehicle, and a third terminal device 500-3 may be provided correspondingly to a third electronic device 600-3 of the vehicle.

The terminal device 500 may be disposed at a cable connected to the electronic device 600 of the vehicle or a connector connecting the electronic device 600 of the vehicle with the cable. Also, the terminal device 500 may be disposed at a printed circuit board (PCB) of the electronic device 600 of the vehicle.

The configuration of the IoT system has been described above.

Hereinafter, a method of determining the degree of hazard of the user setting mode and a method of reinforcing the hazard index data by the IoT system will be described in detail.

First, the hazard index data will be briefly described before describing embodiments of the present disclosure.

FIG. 6 exemplarily illustrates prestored hazard index data according to exemplary embodiments of the present disclosure.

Referring to FIG. 6, the hazard index data may be stored in the form of a table including individual hazard indices determined for respective types of environment information and for respective conditions of each type of the environment information in a prestored user setting mode.

In this case, the user setting mode may include first to third user setting modes. Also, the types of environment information may include external temperature information, air pollution information, GPS information, and the like. Different types of environment information may be used to determine the degree of hazard of the respective user setting modes. Also, for example, if the environment information is external temperature information, conditions for the types of environment information may refer to conditions for the external temperature.

Meanwhile, the individual hazard indices may be in the range of −X to X, where X is an integer. In FIG. 6, the individual hazard indices are set when X is 5. If the server device 400 determines the hazard index of the user setting mode based on the individual hazard indices shown in FIG. 6, it may be considered that the degree of hazard of the current environmental conditions increases as the individual hazard index approaches −5, and the degree of hazard of the current environmental conditions decreases as the individual hazard index approaches 5.

Meanwhile, the method of providing hazard index data is not limited thereto and the hazard index data may also be differently provided depending on the intention of the designer or the user.

Hereinafter, a method of determining whether the user setting mode is hazardous based on the hazard index data described above with reference to FIG. 6 by the server device 400 will be described.

FIG. 7 illustrates a table for describing a method of determining whether a user setting mode is hazardous according to exemplary embodiments of the present disclosure.

Referring to FIG. 7, the user device 100 may receive a command to execute a function of "mode of opening a side window if the weather is sunny and clear" (hereinafter, referred to as a first user setting mode) from the user.

Upon receiving the first user setting mode execution command from the user, the sensor 300 may acquire environment information around the vehicle and transmit acquired sensor value information to the server device 400 via the hub device 200 and the user device 100.

The server device 400 may determine individual hazard indices for respective types of environment information based on the prestored hazard index data and then determine a composite hazard index based on the individual hazard indices.

For example, when the sensor 300 senses an external temperature of 5° C., an air pollution index of 61, and GPS information of "~ City", the server device 400 may determine the individual hazard indices as 0, 2, and 3 respectively for the types of acquired environment information based on the prestored hazard index data, and then determine a composite hazard index as 1.33 based on the individual hazard indices.

Although the server device 400 determines an arithmetical mean of individual hazard indices as the composite hazard index according to the present embodiment, the composite hazard index may also be determined according to any other method, for example, a method of weighing the respective individual hazard indices. Hereinafter, embodiments will be described based on a case in which the arithmetical mean of individual hazard indices is determined as the composite hazard index for descriptive convenience.

If the composite hazard index is deduced based on the arithmetical mean of the individual hazard indices illustrated in FIG. 6, the composite hazard index may be in the range of −5 to 5. The server device 400 may determine that the degree of hazard of the environment around the vehicle increases as the composite hazard index approaches −5 and the degree of hazard of the environment around the vehicle decreases as the composite hazard index approaches 5 using 0 as a reference value.

Since the composite hazard index is determined as 1.33 according to the embodiment, the server device 400 may determine that the environment around the vehicle is not hazardous resulting in opening the side window of the vehicle.

As another example, if the sensor 300 senses an external temperature of −10° C., an air pollution index of 30, and GPS information of "~ County", the server device 400 may determine the individual hazard indices as −4, 4, and 2 respectively for the types of acquired environment information based on the prestored hazard index data, and then determine a composite hazard index as −0.66 based on the individual hazard indices.

Since the composite hazard index is −0.66 which is less than the reference value of 0, the server device 400 may determine that the environment around the vehicle is hazardous and transmit the determination result of the degree of hazard to the user device 100.

The user device 100 may receive the determination result of the degree of hazard from the server device 400 and provide an alarm message informing that the environment around the vehicle is hazardous via the user interface 110.

As another example, if the sensor 300 senses an external temperature of 20° C., an air pollution index of 40, and GPS information of "tunnel", the server device 400 may determine the individual hazard indices as 4, 4, and −5 respectively for the types of acquired environment information based on the prestored hazard index data, and then determine a composite hazard index as 1 based on the individual hazard indices.

The server device 400 may determine that execution of the user setting mode is hazardous when at least one of the individual hazard indices is less than a predetermined reference value even if the determined composite hazard index is greater than a reference value. The server device 400 may set the reference value of the individual hazard indices as −4 based on the hazard index data illustrated in FIG. 6. Meanwhile, the reference value of the individual hazard indices is not limited to −4 and may also be modified by the user.

Although the composite hazard index is determined as 1, the individual hazard index for the GPS information is −5 which is less than the reference value of the individual hazard indices. Thus, the server device 400 may determine that the environment around the vehicle is hazardous and transmit the determination result to the user device 100.

The user device 100 may receive the determination result of the degree of hazard from the server device 400 and provide the user with an alarm message informing that the environment around the vehicle is hazardous to the user via the user interface 110.

As described above, the IoT system may determine whether to execute the control command based on a determination result of the degree of hazard of surrounding environment even after the conditions set by the user are satisfied. That is, upon a determination that the environment is hazardous, the IoT system may not immediately execute the control command thereby deducing a control result to which the intention of the user is more accurately reflected.

Next, the method of reinforcing the hazard index data by the server device 400 will be described.

The server device 400 may receive the user satisfaction information about the execution result of the user setting mode and the environment information acquired while executing the user setting mode from the plurality of user devices 100 and learn reinforcing of the hazard index data based on the received satisfaction information and environment information.

More particularly, the server device 400 may determine the composite hazard index based on the received satisfaction information and environment information and determine individual hazard indices for respective types of the environment information around the vehicle and for respective conditions of each type of the environment information during the current user setting mode based on the environment information and composite hazard index.

The server device 400 may acquire data from more user devices 100 with the lapse of time. As an amount of data acquired by the server device 400 increases, the intention of the user may be reflected more accurately to the constructed hazard index data.

Figure 9:
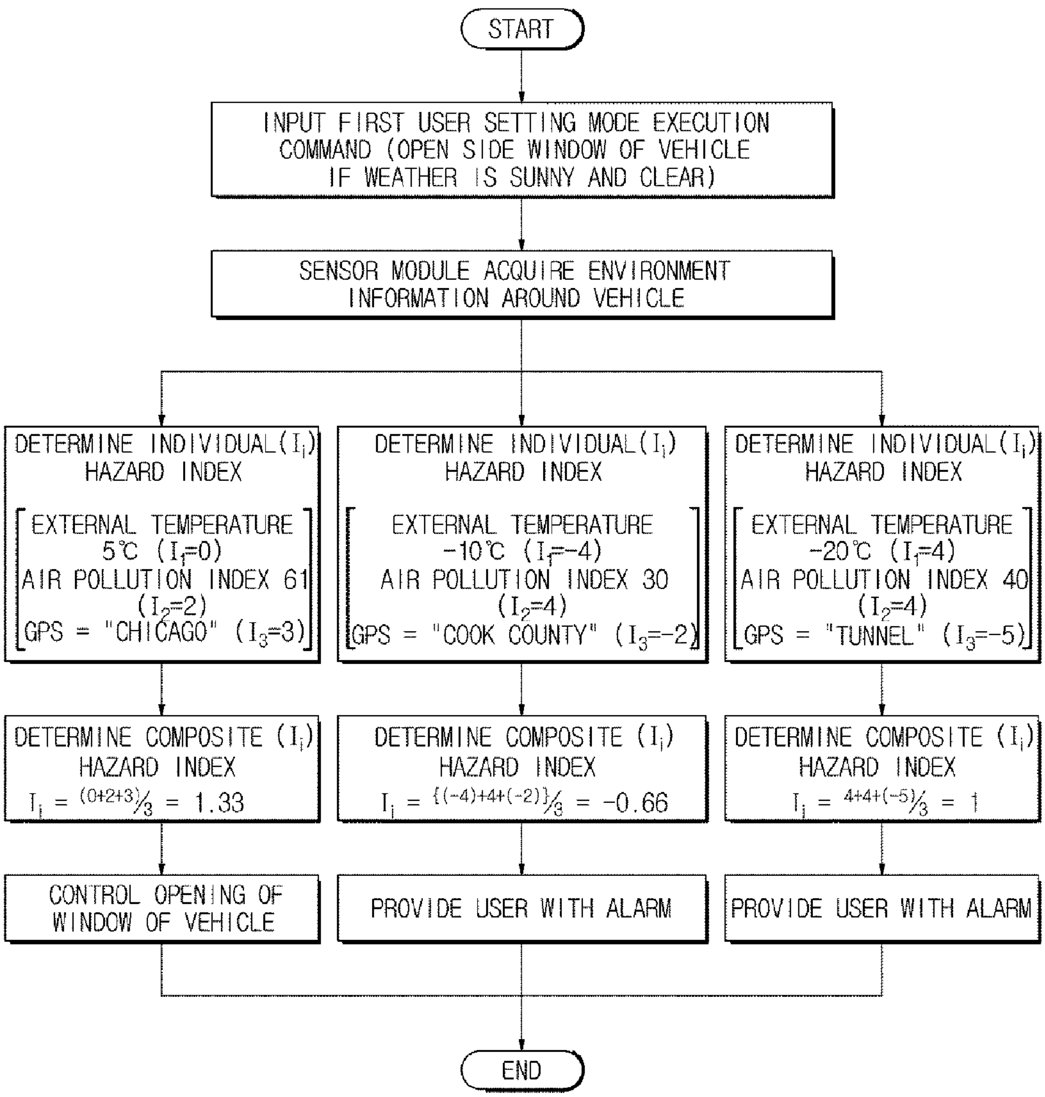

FIGS. 8 and 9 are a table and a flowchart, respectively, for describing a method of reinforcing hazard index data by a server device 400 according to exemplary embodiments of the present disclosure.

As illustrated in FIG. 8, the server device 400 may determine the composite hazard index based on data received from the plurality of user devices 100. Here, the composite hazard index may be a value indicating the degree of user's satisfaction in a state that the sensor values acquired by the plurality of sensors 300 are combined. Thus, a number of composite hazard indices may be deduced for a single user setting mode depending on conditions for combination of the plurality of sensor values.

For example, referring to FIG. 8, various composite hazard indices may be deduced for the first user setting mode depending on conditions of combinations of sensor values of the external temperature sensor 300, the air pollution sensor 300 and the GPS device. More particularly, a composite hazard index for the first user setting mode may be deduced as 1.33 under the first combination conditions (external temperature of 6° C., air pollution index of 61, and GPS information of ~ City), a composite hazard index for the first user setting mode may be deduced as −0.66 under the second combination conditions (external temperature of −10° C., air pollution index of 10, and GPS information of ~ County), and a composite hazard index for the first user setting mode may be deduced as 1 under the third combination conditions (external temperature of −20° C., air pollution index of 40, and GPS information of ~ tunnel).

Upon receiving satisfaction information from the plurality of user devices 100 with respect to the same combination conditions of the environment information around the vehicle, the server device 400 may determine the composite hazard index by using an average of scores of the received satisfaction information. For example, upon receiving satisfaction information from the plurality of user devices 100 with respect to the first combination conditions of FIG. 8, the server device 400 may determine the composite hazard index as a value different from 1.33 in accordance with the scores of the received satisfaction information.

Next, the server device 400 may determine the individual hazard indices for respective types of the environment information around the vehicle and for respective conditions of each type of the environment information in the current user setting mode based on the environment information around the vehicle information and the composite hazard index.

For example, the server device 400 may determine individual hazard indices for external temperatures by condition, individual hazard indices for air pollution indices by condition, and individual hazard indices for GPO information by condition in the first user setting mode based on the environment information around the vehicle and the composite hazard index for the first user setting mode of FIG. 8. The server device 400 may reinforce hazard index data by comparing the individual hazard indices deduced by the aforementioned method with the existing hazard index data. FIG. 9 exemplarily illustrates a method of reinforcing the hazard index data by subdividing the ranges of the external temperature. As the amount of data received by the server device 400 increases, intention of the user may be more accurately reflected to the constructed hazard index data.

The configuration of the IoT system has been described. Next, a process of controlling the IoT system will be described in detail.

First, a process of controlling execution of the user setting mode by sensing hazardous environment information around the vehicle by the IoT system will be described with reference to FIG. 10, and then a process of reinforcing the hazard index data by the IoT system will be described with reference to FIGS. 11 and 12.

Figure 10:
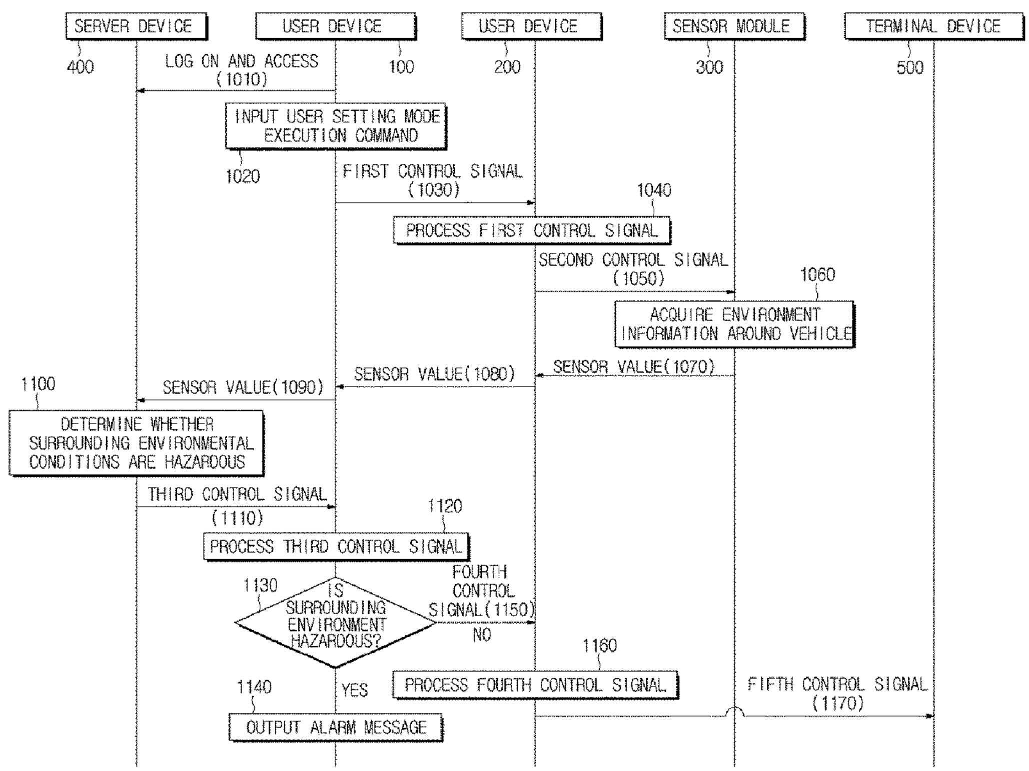
FIG. 10 is a flowchart for describing a process of controlling execution of a user setting mode by an IoT system according to exemplary embodiments of the present disclosure.

FIG. 10 is a flowchart for describing a process of controlling execution of a user setting mode by an IoT system according to exemplary embodiments of the present disclosure.

Referring to FIG. 10, first, the user device 100 may access and log on to the server device 400 (1010).

The user device 100 may transmit an access request and identification information of the user device 100 to the server device 400. For example, the user device 100 may transmit MAC address, IP address, universal identifier, name, information about driver's account (e.g., account ID) and the like to the server device 400.

In addition, the user device 100 may transmit authentication information to the server device 400 to log on to the server device 400. For example, the user device 100 may transmit a password previously input by the driver to the server device 400.

Although FIG. 10 exemplarily illustrates a case in which a single user device 100 accesses the server device 400, a plurality of user devices 100 may also access the server device 400. Thus, the server device 400 may receive user satisfaction information and sensor value information regarding the environment around the vehicle from the plurality of user devices 100 and construct hazard index data for the user setting modes based thereon.

When the user device 100 accesses the server device 400 and the user setting mode execution command is input to the user device 100 (1020), the user device 100 may output a first control signal including the user setting mode execution command to the hub device 200 (1030).

The hub device 200 may receive the first control signal from the user device 100 and process the received first control signal (1040). Particularly, the hub device 200 may generate a second control signal based on a target sensor of the control command included in the first control signal and the content of the control command, and transmit the generated second control signal to the sensor 300 (1050).

Upon receiving the second control signal from the hub device 200, the sensor 300 may acquire environment information around the vehicle 1 and transmit the sensor values about the acquired information to the hub device 200. More particularly, the environment information about the vehicle 1 acquired by the target sensor selected from all sensors 300 may be transmitted to the hub device 200 (1060 and 1070).

The hub device 200 may receive sensor values about the environment information around the vehicle 1 from the target sensor and transmit the received sensor values to the user device 100 (1070 and 1080). Then, the user device 100 may transmit the sensor value information received from the hub device 200 to the server device 400 (1080 and 1090).

The server device 400 may determine whether execution of the user setting mode is hazardous under the current environmental conditions around the vehicle, based on the prestored hazard index data and the sensor value information received from the user device 100 (1100).

More particularly, the server device 400 may determine individual hazard indices for the respective types of acquired environment information based on the prestored hazard index data and then determine the composite hazard index based on the individual hazard indices.

If the composite hazard index is less than a predetermined reference value, the server device 400 may determine that execution of the user setting mode is hazardous under the current environmental conditions around the vehicle. On the contrary, if the composite hazard index is greater than the predetermined reference value, the server device 400 may determine that execution of the user setting mode is suitable under the current environmental conditions around the vehicle. Hereinafter, descriptions presented above with regard to the server device controller 430 will not be repeated.

Upon determination of the degree of hazard of the user setting mode, the server device 400 may transmit a third control signal including information about the determination result to the user device 100 (1110).

The user device 100 may receive the third control signal from the server device 400 and process the received third control signal (1120).

Upon a determination that the environment around the vehicle is hazardous to execute the user setting mode as a result of processing the third control signal, the user device 100 may output an alarm message informing the user of the same (1130 and 1140).

On the contrary, upon determination that the environment around the vehicle is suitable to execute the user setting mode as a result of processing the third control signal, the user device 100 may output a fourth control signal to the hub device 200 (1130 and 1150).

The hub device 200 may receive the fourth control signal from the user device 100 and process the received fourth control signal (1160).

The hub device 200 may determine a target electronic device 600 by processing the fourth control signal and output a fifth control signal to a target terminal device 500 (1170).

Figure 11:
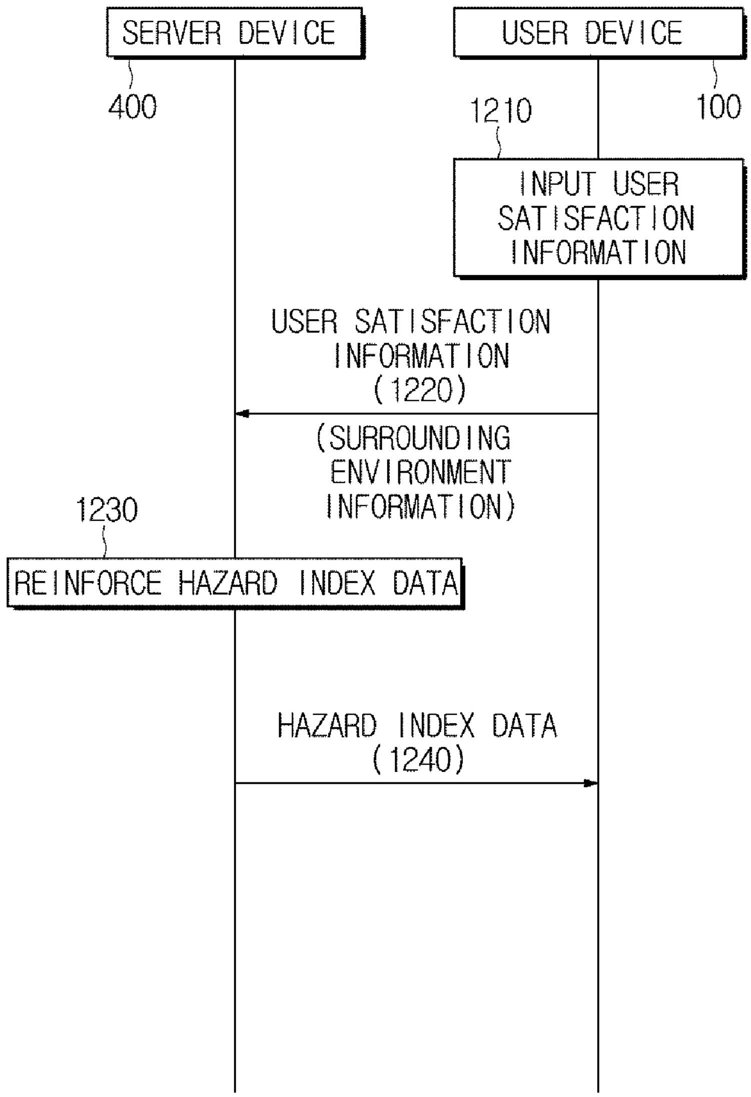
FIGS. 11 and 12 are flowcharts for describing a process of reinforcing hazard index data by an IoT system according to exemplary embodiments of the present disclosure.
Figure 12:
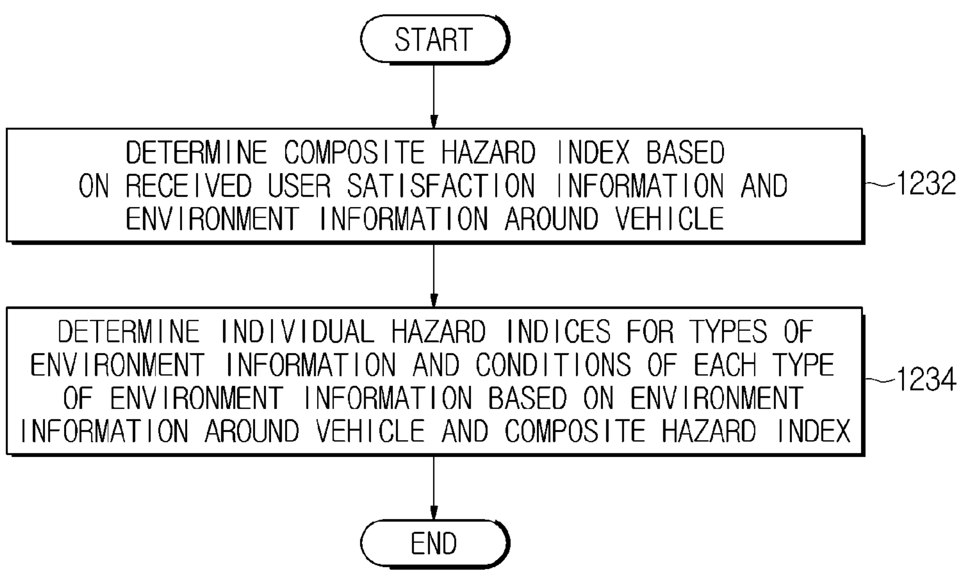

FIGS. 11 and 12 are flowcharts for describing a process of reinforcing hazard index data by an IoT system according to exemplary embodiments of the present disclosure.

The embodiments will be described based on a case in which the user device 100 is connected to the server device 400 with reference to FIGS. 11 and 12.

As illustrated in FIG. 11, when user satisfaction information is input to the user device 100 (1210), the user device 100 may transmit the user satisfaction information to the server device 400. In this case, the user device 100 may also transmit sensor value information about the environment around the vehicle when the user setting mode is executed, to the server device 400 (1220).

The server device 400 may reinforce the hazard index data based on the data received from the user device 100 (1230).

Referring to FIG. 12, the process of reinforcing the hazard index data may include determining the composite hazard index of the current user setting mode based on the received satisfaction information and environment information around the vehicle (1232), and determining the individual hazard indices for respective types of environment information and for respective conditions of each type of the environment information for the current user setting mode based on the environment information around the vehicle and the composite hazard index (1234).

The server device 400 may reinforce the prestored hazard index data by combining the individual hazard indices determined for respective conditions of each type of the environment information.

Also, the server device 400 may transmit hazard index data to the user device 100 upon request from the user device 100 (1240).

As is apparent from the above description, the following effects may be obtained according to the IoT system and the method of controlling the same according to embodiments of the present disclosure.

According to the IoT system and the method of controlling the same, reliability may increase since the IoT system determines whether to execute the user setting mode in consideration of hazardous factors of surrounding environments even during a normal operation as well as during a faulty operation. As a result, IoT systems having reliability may also be constructed in automotive, industrial, and medical environments as well as in household environments.

Also, user setting modes may be provided with high safety by combining a large number of various IoT apparatuses, and thus various services may be provided using the same.

Although exemplary embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An Internet of things (IoT) system for a vehicle, comprising:

a user device for receiving a user setting mode execution command to control operations of one or more electronic devices of the vehicle;

a sensor for acquiring environment information surrounding the vehicle based on a user setting mode upon receiving the user setting mode execution command from the user device; and a server device for determining a composite hazard index of environmental conditions based on the environment information surrounding the vehicle and prestored hazard index data, for determining that the environmental conditions are hazardous if the composite hazard index is less than a reference value, and for providing a user of the user device with an alarm message via the user device upon determination that the environmental conditions are hazardous;

wherein the server device receives user satisfaction information about an execution result of the user setting mode and environment information acquired while executing the user setting mode from a plurality of user devices comprising the user device, and reinforces the prestored hazard index data based on the user satisfaction information about the execution result of the user setting mode and the environment information acquired while executing the user setting mode.

2. The IoT system according to claim 1, wherein the prestored hazard index data comprises individual hazard indices for respective types of the environment information and for respective conditions of each type of the environment information in the user setting mode.

3. The IoT system according to claim 1, wherein the server device determines individual hazard indices for respective types of the environment information based on the prestored hazard index data and determines the composite hazard index of the environmental conditions based on the individual hazard indices.

4. The IoT system according to claim 3, wherein if at least one of the individual hazard indices is less than the reference value, the server device determines that the environmental conditions are hazardous by considering the individual hazard indices prior to the determined composite hazard index.

5. The IoT system according to claim 1, wherein the server device determines the composite hazard index based on the user satisfaction information and the environment information, and determines individual hazard indices for respective types of the environment information and for respective conditions of each type of the environment information in the user setting mode based on the environment information and the composite hazard index.

6. The IoT system according to claim 1, wherein the server device transmits the prestored hazard index data to the user device upon request from the user device.

7. The IoT system according to claim 1, wherein the sensor acquires the environment information around the sensor related to the user setting mode among a plurality of sensors.

8. The IoT system according to claim 1, wherein upon receiving a new user setting mode execution command from a user, the server device determines whether the new user setting mode is hazardous based on the prestored hazard index data.

9. A method of controlling an Internet of things (IoT) system of a vehicle, the method comprising steps of:

receiving a user setting mode execution command inputted on a user device to control operations of one or more electronic devices of the vehicle;

acquiring environment information surrounding the vehicle by a sensor based on a user setting mode upon receiving the user setting mode execution command from the user device;

receiving, by a server device, the environment information and determining a composite hazard index of environmental conditions based on the environment information surrounding the vehicle and hazard index data prestored in the server device;

determining, by the server device, that the environmental conditions are hazardous if the composite hazard index is less than a reference value;

providing, by the server device, a user of the user device with an alarm message via the user device upon determining that the environmental conditions are hazardous, receiving, by the server device, user satisfaction information about an execution result of the user setting mode and the environment information acquired while executing the user setting mode from a plurality of user devices comprising the user device, and reinforcing, by the server device, the hazard index data based on user satisfaction information about the execution result of the user setting mode and the environment information acquired while executing the user setting mode.

10. The method, according to claim 9, wherein the hazard index data comprises individual hazard indices for respective types of the environment information and for respective conditions of each type of the environment information in the user setting mode.

11. The method according to claim 9, wherein the step of receiving the environment information and determining the composite hazard index of the environmental conditions comprises:

determining individual hazard indices for respective types of the environment information based on the hazard index data, and determining the composite hazard index of the environmental conditions based on the individual hazard indices.

12. The method according to claim 11, wherein the step of receiving the environment information and determining the composite hazard index of the environmental conditions further comprises:

if at least one of the individual hazard indices is less than the reference value, determining that the environmental conditions are hazardous by considering the individual hazard indices prior to the determined composite hazard index.

13. The method according to claim 9, wherein the step of reinforcing the hazard index data based on the user satisfaction information and the environment information comprises:

determining the composite hazard index based on the user satisfaction information and the environment information, and determining individual hazard indices for respective types of the environment information and for respective conditions of each type of the environment information based on the environment information and the composite hazard index.

14. The method according to claim 9, further comprising a step of transmitting the hazard index data to the user device by the server device upon request from the user device.

15. The method according to claim 9, further comprising a step of upon receiving a new user setting mode execution command from the user, determining whether the new user setting mode is hazardous based on the hazard index data by the server device.

* * * * *